Patented Dec. 22, 1942

2,305,872

UNITED STATES PATENT OFFICE 2,305,872

PROCESS OF ELECTROSTATIC SEPARATION OF MIXTURES

Richard Heinrich, Frankfort-on-the-Main, Germany; vested in the Alien Property Custodian No Drawing. Application September 24, 1940, Serial No. 358,181. In Germany October 31, 1939

4 Claims. (Cl. 209—127)

The invention relates to a process of electrostatic separation of mixtures of more or less subdivided materials having dissimilar electrical properties. In the operation of electrostatic separators in which the materials to be separated are passed between oppositely charged electrodes, it has been found that smooth operation is prevented or hindered by flash-overs associated with spray (Sprüh) discharges between the electrodes caused by portions of the material moving between or adhering to the electrodes.

According to the invention, this difficulty is overcome by enriching the atmosphere in the electrostatic field with the vapors of preferably chlorinated or fluorinated hydrocarbons such as trichlorethylene. In addition to the halogenated hydrocarbons, a variety of carbon and similar compounds may be used, for example, tetrachlorethane, ethylene chloride, paradichlorbenzol, monofluortrichlormethane, dichlordifluoromethane and the like. Quite small additions of these compounds are useful for preventing the difficulties referred to and for making possible an increase in the field strength of, for example, 20–30% over that heretofore attained.

A possible explanation of the phenomenon is that the relatively large carbon or hydrocarbon molecules have the property of attracting electrons and when the electron or ion deluge or avalanche which accompanies a spark discharge between the electrodes occurs, the electrons are absorbed by the large molecules and the breakdown of the electrostatic field is prevented.

The degree of saturation of the atmosphere of the electrostatic field with the compounds referred to may be regulated by regulation of the temperature of the atmosphere.

The effect of, for example, the addition of $CCl_4$ at different partial pressures is shown by the following table. If the flash-over potential in pure air is 1, then the factor $f$ in the following table represents the increase in flash-over or breakdown potential produced by the tabulated additions.

| Partial pressure $CCl_4$ mm. Hg: | Improvement factor (pure air=1): |
|---|---|
| 100 | 2.2 |
| 200 | 2.8 |
| 300 | 3.3 |
| 400 | 3.8 |
| 500 | 4.2 |
| 600 | 4.6 |
| 700 | 5.0 |

The above figures were determined in tests carried out at 75° C. and at atmospheric pressure between round electrodes 100 mm. in diameter.

The field intensity or disruptive strength of the electrostatic field readily is raised by additions of $CCl_4$ from 2.2 to 5 times its value when the atmosphere of the field is pure air.

With other gases the following values for the factor $f$ are obtained.

| | | |
|---|---|---|
| $CO_2$, | 760 mm. Hg | $f=.98$ |
| $Cl_2$, | 760 mm. Hg | $f=1.72$ |
| $CCl_2F_2$, | 760 mm. Hg | $f=2.66$ |
| $CCl_3F$, | 760 mm. Hg | $f=3.5$ |

I claim:

1. In a process for separating the constituents of a mixture of finely divided solid materials having dissimilar electrical properties involving the operation of passing the mixture between oppositely charged electrodes providing therebetween an electrostatic field, the mode of preventing a breakdown of the electrostatic field which consists in enriching the atmosphere in the electrostatic field between the electrodes with a halogen derivative of a hydrocarbon.

2. Process as defined in claim 1 in which the partial pressure of the halogen and carbon-containing compound in the atmosphere is regulated according to the desired breakdown potential of the atmosphere.

3. Process as defined in claim 1 in which the concentration of halogen and carbon-containing compound in the atmosphere is regulated by regulating the temperature thereof.

4. Process as defined in claim 1 in which the carbon compound is a halogen derivative of a hydrocarbon of the group consisting of chlorine and fluorine derivatives of hydrocarbons.

RICHARD HEINRICH.